(12) United States Patent
Demming

(10) Patent No.: US 12,151,545 B2
(45) Date of Patent: *Nov. 26, 2024

(54) VEHICLE BOW TOP CLIP

(71) Applicant: Arcus Products, Inc., Palm Beach Gardens, FL (US)

(72) Inventor: Timothy J. Demming, Palm Beach Gardens, FL (US)

(73) Assignee: Arcus Products, Inc., Palm Beach Gardens, FL (US)

( * ) Notice: Subject to any disclaimer, the term of this patent is extended or adjusted under 35 U.S.C. 154(b) by 94 days.

This patent is subject to a terminal disclaimer.

(21) Appl. No.: 18/067,354

(22) Filed: Dec. 16, 2022

(65) Prior Publication Data

US 2023/0150347 A1 May 18, 2023

Related U.S. Application Data

(63) Continuation-in-part of application No. 17/152,320, filed on Jan. 19, 2021, now Pat. No. 11,554,648.

(60) Provisional application No. 62/963,821, filed on Jan. 21, 2020.

(51) Int. Cl.
| | |
|---|---|
| B60J 7/12 | (2006.01) |
| B60N 3/02 | (2006.01) |
| B60R 7/08 | (2006.01) |
| B60R 11/00 | (2006.01) |

(52) U.S. Cl.
CPC ............ *B60J 7/1204* (2013.01); *B60N 3/026* (2013.01); *B60R 7/08* (2013.01); *B60R 11/00* (2013.01); *B60R 2011/0028* (2013.01)

(58) Field of Classification Search
CPC .......... F16B 2/22; A47C 31/04; B60J 7/1204; B60N 3/026; B60R 7/08; B60R 2011/0028
USPC ....................................................... 269/214
See application file for complete search history.

(56) References Cited

U.S. PATENT DOCUMENTS

| | | | | |
|---|---|---|---|---|
| 564,573 | A * | 7/1896 | Hartshorn | A47C 31/04 24/350 |
| 4,988,141 | A | 1/1991 | Takada | |
| 5,460,409 | A | 10/1995 | Conner | |
| 6,318,791 | B1 | 11/2001 | Pfertner | |
| 9,205,724 | B2 * | 12/2015 | Marcus | B60J 3/02 |
| 10,343,575 | B1 * | 7/2019 | Lynn | B60N 3/026 |
| 11,091,079 | B1 * | 8/2021 | Lynn | B60N 3/026 |
| 11,667,225 | B2 * | 6/2023 | Harvey | B60N 3/026 296/102 |
| 11,904,751 | B2 * | 2/2024 | Lynn | B60R 11/06 |
| 2018/0147981 | A1 * | 5/2018 | Troeger | B60Q 3/267 |

* cited by examiner

*Primary Examiner* — Robert Sandy
(74) *Attorney, Agent, or Firm* — McHale & Slavin, P.A.

(57) ABSTRACT

A device or system for use in vehicles, such as jeeps, having soft tops. The device or system may include a bow top clip which is configured to engage with, mount on, or secure to a portion of the vehicle, such as the roll bar cage. To help prevent the vehicle soft top from flapping, the vehicle bow top clip is configured to receive and hold a crossbar member.

20 Claims, 20 Drawing Sheets

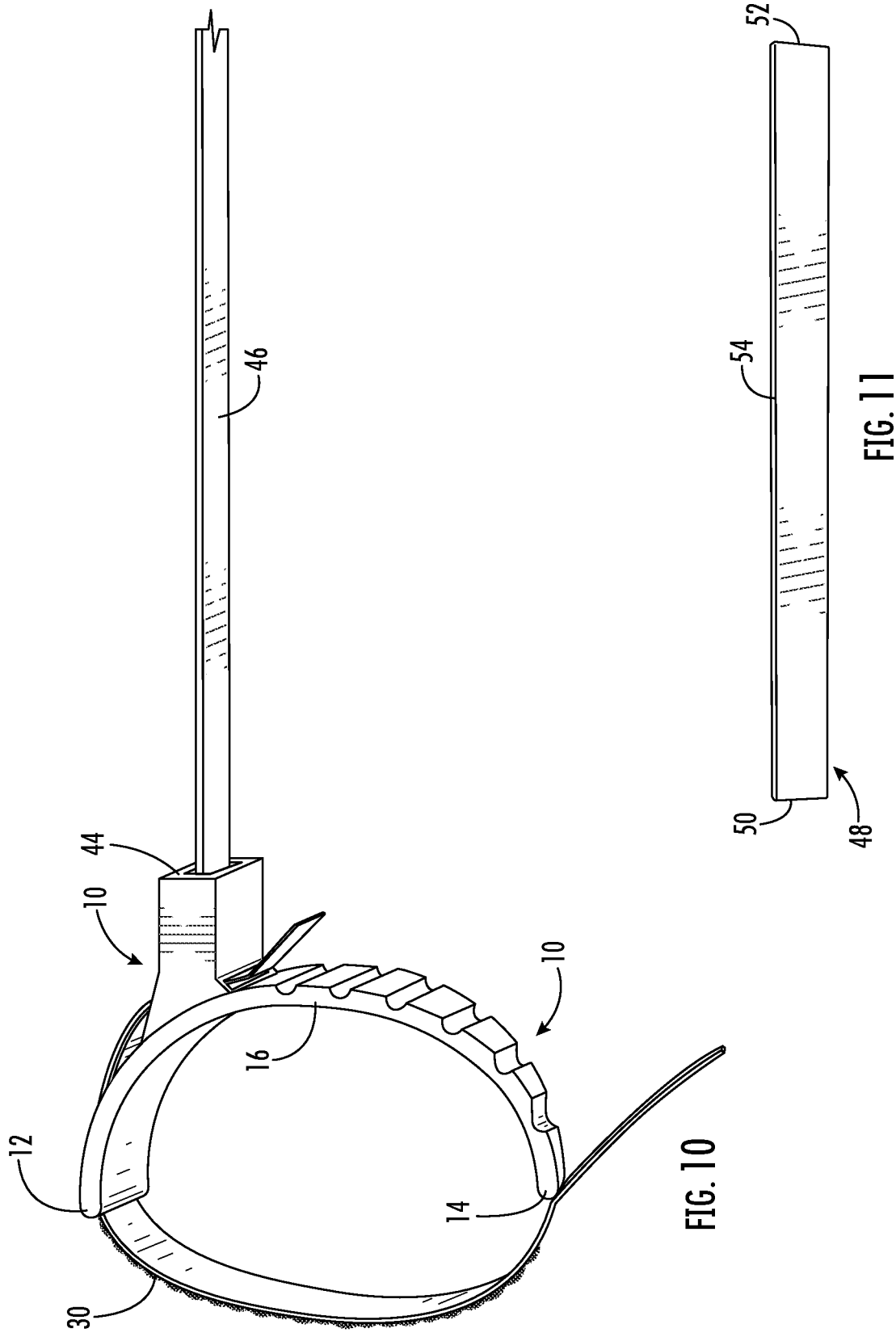

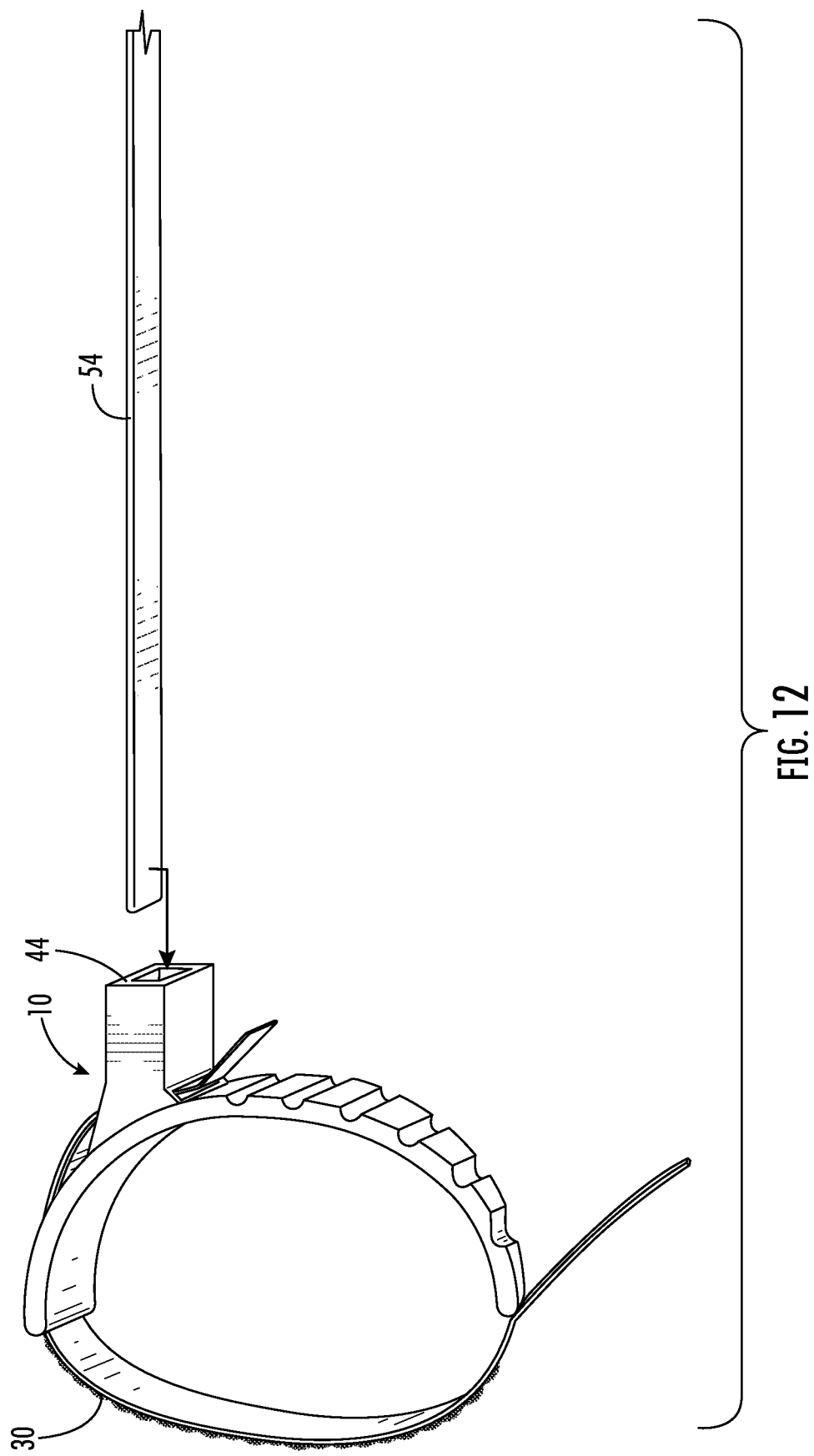

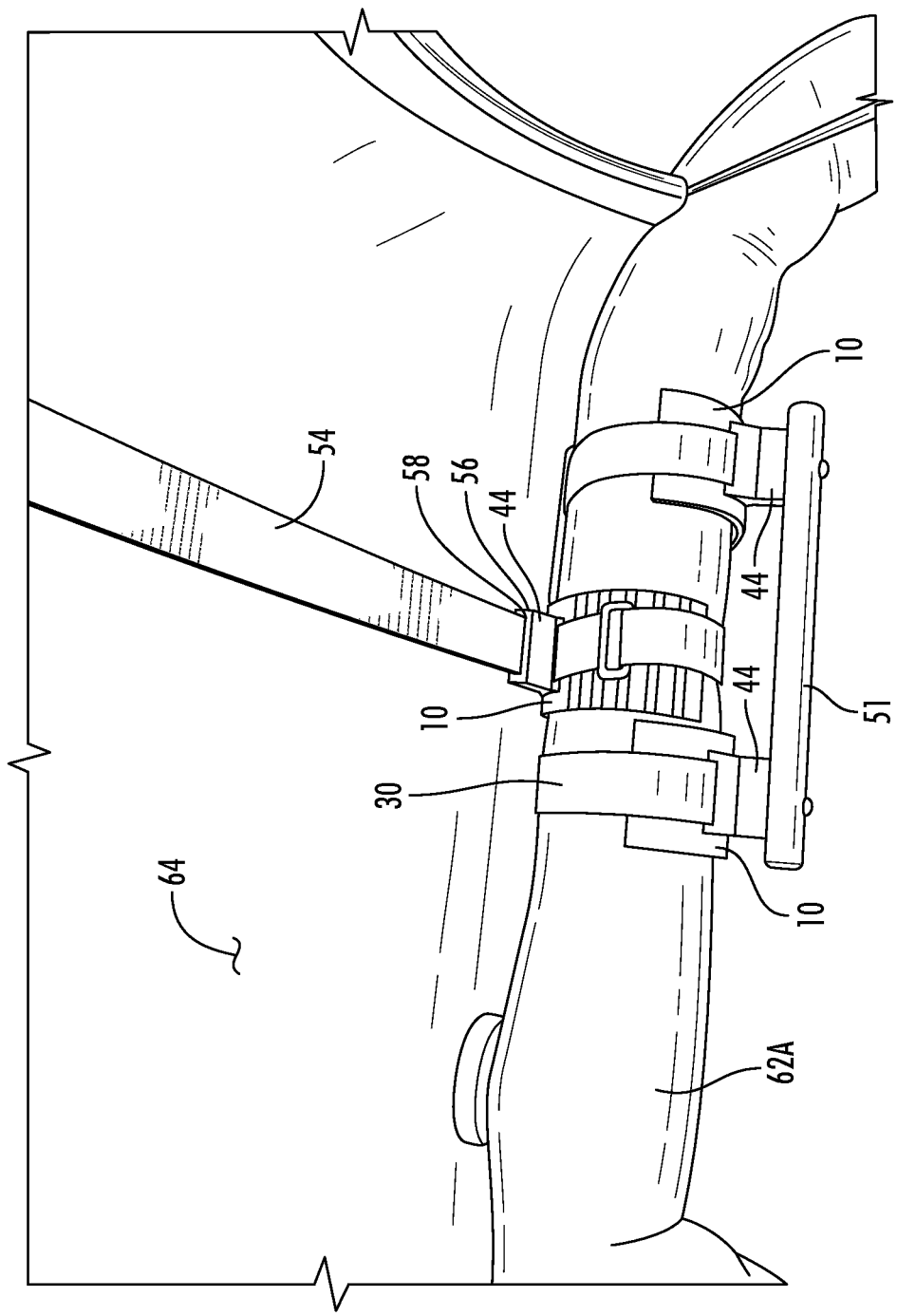

VEHICLE BOW TOP CLIP

CROSS REFERENCE TO RELATED APPLICATIONS

In accordance with 37 C.F.R. 1.76, a claim of priority is included in an Application Data Sheet filed concurrently herewith. Accordingly, the present invention claims priority as a continuation-in-part of U.S. patent application Ser. No. 17/152,320, entitled "VEHICLE BOW TOP CLIP", filed Jan. 19, 2021, which claims priority to U.S. Provisional Patent Application No. 62/963,821, entitled "VEHICLE BOW TOP CLIP", filed Jan. 21, 2020. The contents of the above referenced applications are incorporated herein by reference in their entirety.

FIELD OF THE INVENTION

The present invention is related to vehicle parts; to an automobile bow top clip; and more particularly, to a bow top clip for use with soft tops; and specifically, to a vehicle bow top clip securable to a roll bar cage of a JEEP.

BACKGROUND OF THE INVENTION

Off road vehicles, such as JEEPs, are popular vehicles for riding in off-road terrains and on traditional modern, paved streets. Such JEEPs have the advantage of being made with a soft top or hard top. While hard tops may have the advantage of being more secure and more durable, one of the main advantages of a soft top is the ease of removal, allowing the user to have an open air top when the weather is nice. In addition, since soft tops are easily removable and foldable, large items may be transported with ease.

One of the disadvantages of soft tops is that, due to lack of support, they are subjectable to some form of top flapping at high speeds, such as highway speeds of 55 MPH or greater. While factory installed soft tops tend to experience less top flapping, all soft tops will experience this phenomenon. Many aftermarket soft tops experience this effect more so than factory installed soft tops. The flapping effect may also be more pronounced with "bikini" tops, those covers having materials to cover the top only, no sides. As such, there exists a need to prevent or minimize top flapping for vehicles, such as JEEPs, that use soft tops.

SUMMARY OF THE INVENTION

The present invention includes a device or system for use in vehicles, such as JEEPs, having soft tops. The device or system may include a clip which is configured to engage with, mount on, or secure to a portion of the vehicle, such as the roll bar cage. To help prevent the vehicle soft top from flapping, this vehicle clip is configured to receive and hold a crossbar member, referred to as a bow.

Accordingly, it is an objective of the invention to provide a vehicle bow top clip.

It is yet another objective of the invention to provide a vehicle bow top clip configured to prevent or minimize vehicle soft top flapping when the vehicle is traveling at high speeds.

It is a further objective of the invention to provide a bow top clip for use in vehicles that have a soft top.

It is yet another objective of the invention to provide a vehicle bow top clip which engages with, mounts on, or secures to at least a portion of a vehicle that has a soft top.

It is a still further objective of the invention to provide a vehicle bow top clip which engages with, mounts on, or secures to at least a portion of a vehicle roll cage.

It is yet another objective of the instant invention to provide a vehicle bow top clip which engages with, mounts on, or secures to at least a portion of a roll bar cage of a JEEP.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 10 illustrates the vehicle bow top clip with bow secured thereto;

FIG. 11 is an illustrative embodiment of the bow;

FIG. 12 is a partial exploded view of the vehicle bow top clip;

FIG. 13B illustrates a partial view a JEEP, with a first vehicle bow top clip with a cross bow secured to a roll bar cage of the JEEP, along with two additional vehicle bow top clips, with a hang bar, secured to a different section of the JEEP roll bar cage;

DETAILED DESCRIPTION OF THE INVENTION

Figure 1A:
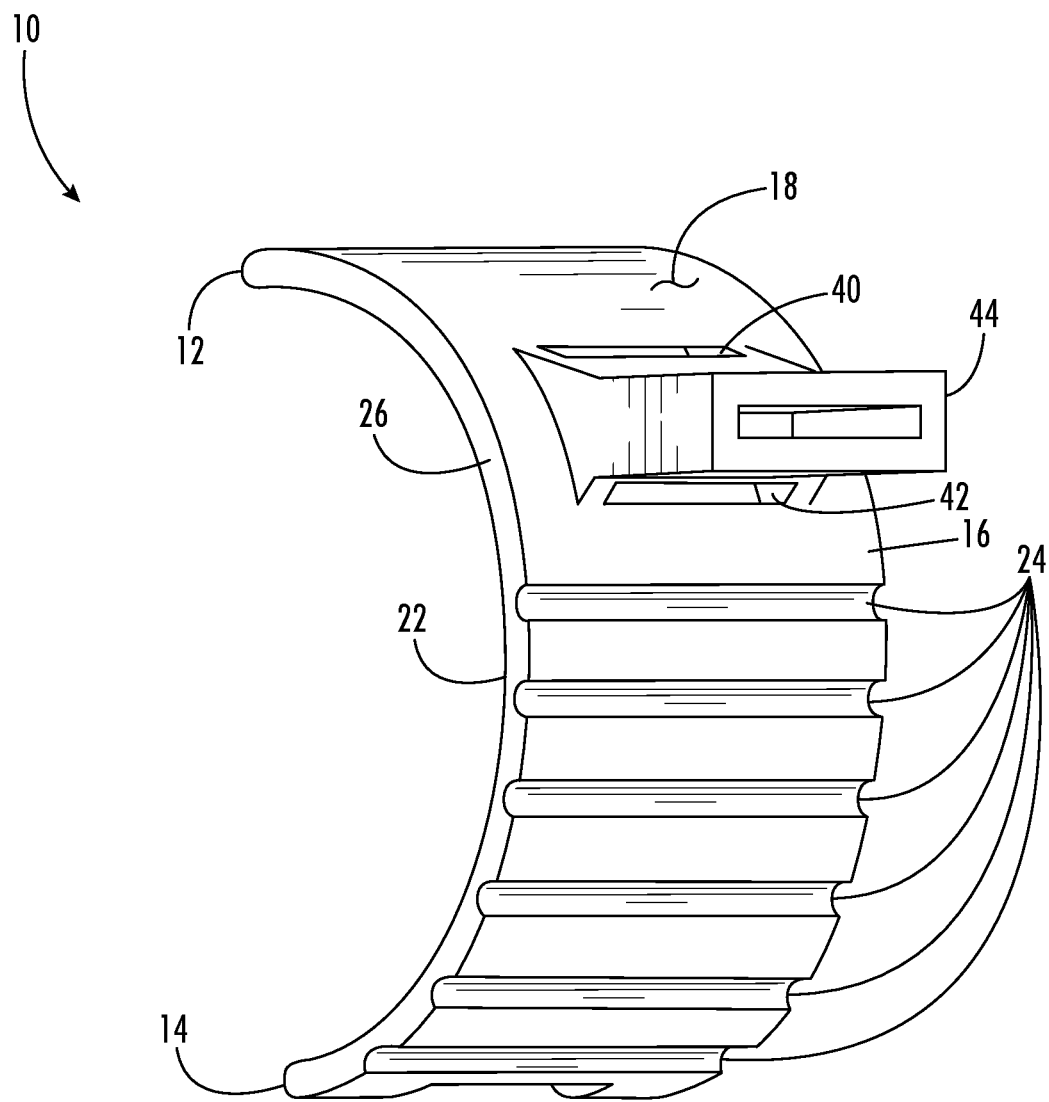
FIG. 1A is a front perspective view of an embodiment of a vehicle bow top clip.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The present invention includes a device or system that addresses the issues related to the use of soft tops in vehicles. While the device or system may be described in relation to use with a vehicle, such as a JEEP, such device or system may be applicable to other vehicles. Referring to FIGS. 1A and 2-6C, an illustrative example of a bow top clip for use with vehicle soft tops, referred to generally as a vehicle bow top clip 10, is illustrated. The vehicle bow top clip 10 comprises a first end 12, a second opposing end 14, and a main body 16 extending the distance between the first end 12 and the second end 14. The vehicle bow top clip main body 16 has an outer surface 18 and an inner surface 20, see FIG. 3 or FIG. 4. The outer surface 18 is defined as the surface not in contact with a portion of the vehicle, i.e. the roll bar in a JEEP, when the vehicle bow top clip 10 is secured thereto. The inner surface 20 is defined as the surface which is in contact with a portion of the vehicle, i.e. the roll bar in a JEEP, when the vehicle bow top clip 10 is secured thereto.

The vehicle bow top clip main body 16 is designed to engage with, mount on, or secure to at least a portion of a vehicle. As such, the vehicle bow top clip main body 16 may be designed to mirror the shape of the portion of the vehicle it engages with, mounts on, or secures to. The vehicle bow top clip main body 16 may be curved, such as having a concave curvature 22, thus assuming a C-shape or partial C-shape. The curvature 22 of the vehicle bow top clip main body 16 may be designed to have the same shape or curvature of the vehicle portion, such as the roll bar that the top clip main body 16 engages with, mounts on, or secures to. The vehicle bow top clip main body 16 may be made of a flexible or semi-flexible material, such as a plastic material, that can be used with roll bars of different sizes.

Figure 1B:
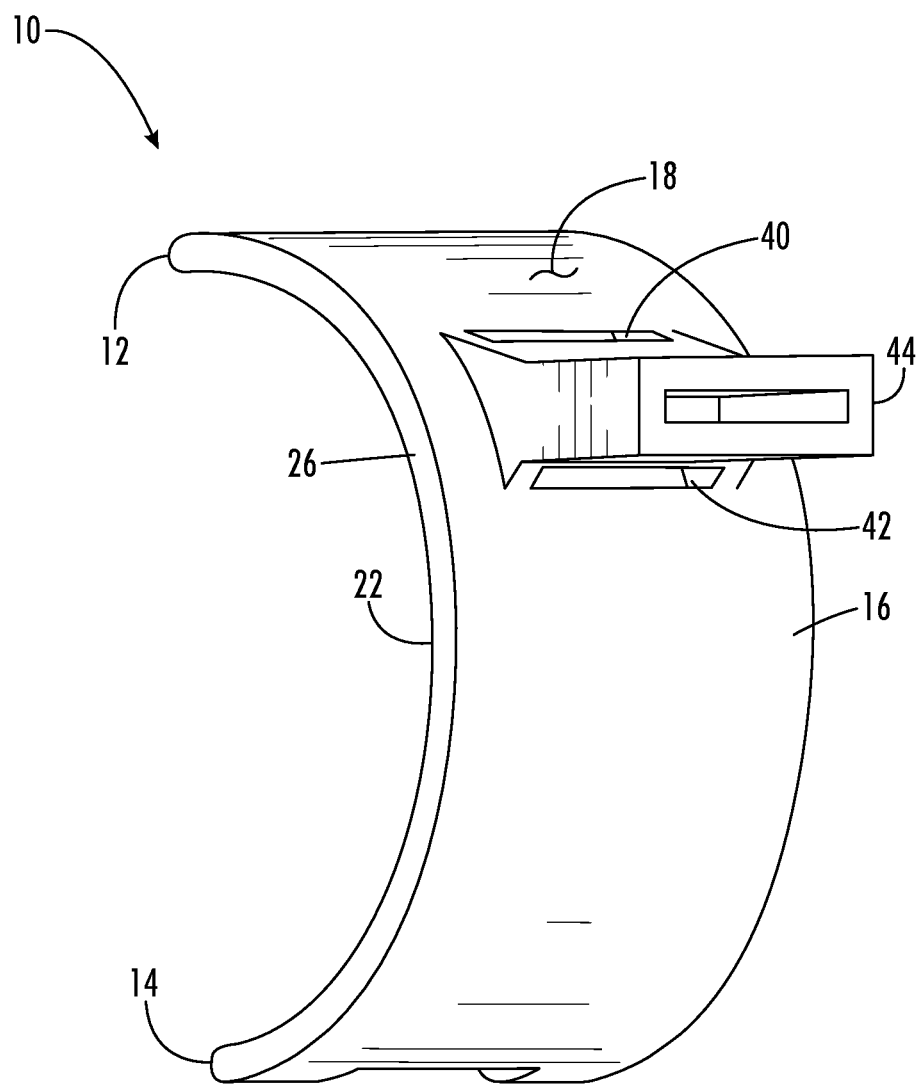
FIG. 1B illustrates the vehicle bow top clip illustrated in FIG. 1A, shown without channels cut across a surface.

The top clip main body 16 may contain at least one, but preferably multiple cut outs or channels/grooves 24. Each of the channels 24 are sized to extend from a first main body side 26 to a second main body side 28 (see FIG. 3). Each of the top clip main body cut outs or channels 24 allow for flexing or extending over large or small roll bars, padded roll bars, or other portions of the vehicle which engage with, mount on, or secure to the vehicle bow top clip 10. While the vehicle bow top clip 10 is shown having multiple top clip main body cut outs or channels 24, such embodiment is illustrative only. FIG. 1B shows an embodiment of the vehicle bow top clip 10 without channels cut across the outer surface 18 of the top clip main body 16.

Figure 8:
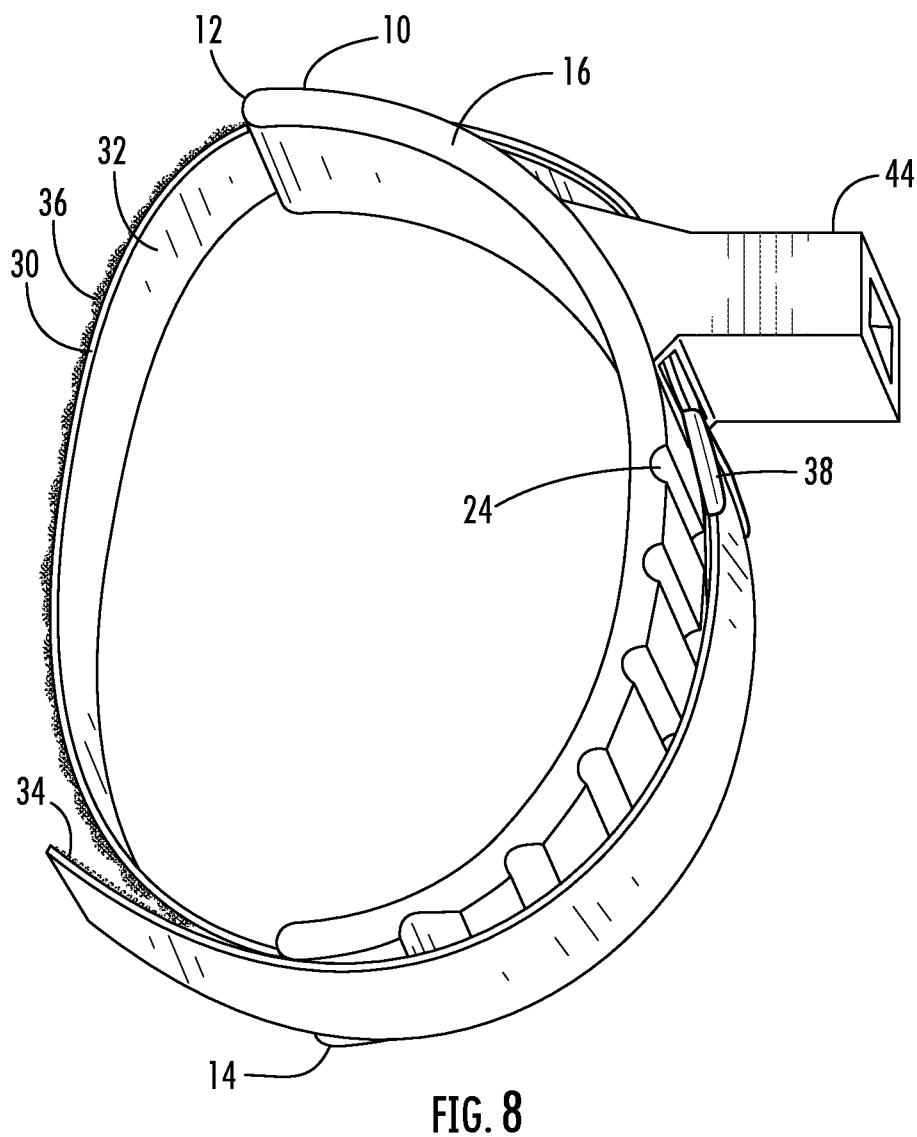
FIG. 8 is a right side view of the vehicle bow top clip, shown with an attachment member.
Figure 9:
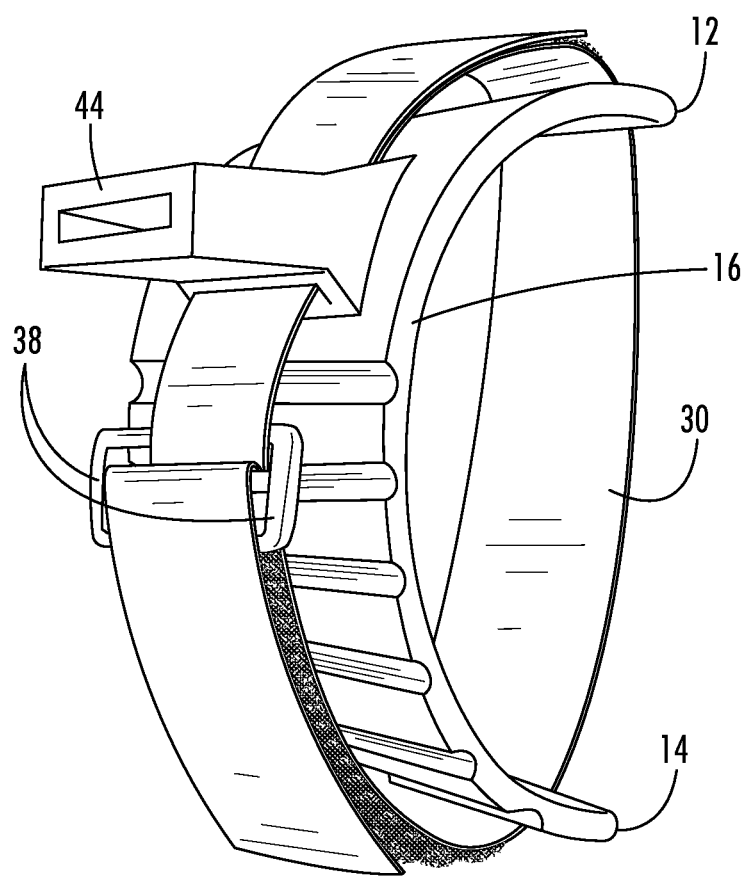
FIG. 9 is a left side perspective view of the vehicle bow top clip, shown with an attachment member.

While the vehicle bow top clip 10 may be designed to be friction fit or snap fit onto a portion of the vehicle, other mechanisms may be used. FIGS. 8 and 9 illustrate the vehicle bow top clip 10 with a securing member 30. The securing member 30 is illustrated as a strip of material 32 having loop 34 and hook 36 fastening members, such as VELCRO, see FIG. 8. Two portions of the strip of material 32 may be held together with the use of a slotted clasp 38, see FIG. 9. Cut into the top clip main body 16 are two securing member receiving slots, 40 and 42, see FIG. 1, FIG. 5A, or FIG. 5B. The securing member receiving slots, 40 and 42, are sized and shaped to receive and hold in place portions of the securing member 30. In an illustrative embodiment, the securing member receiving slot 40 is positioned above a cross member receiving structure 44 and the securing member receiving slot 42 is positioned below the crossbar receiving structure 44, see FIG. 1A. While the strip of material 32 is described as using loop 34 and hook 36 fastening members, other fastening members such as buttons/slots, snaps, or clasps, or mechanisms known to one of skill in the art.

Figure 2:
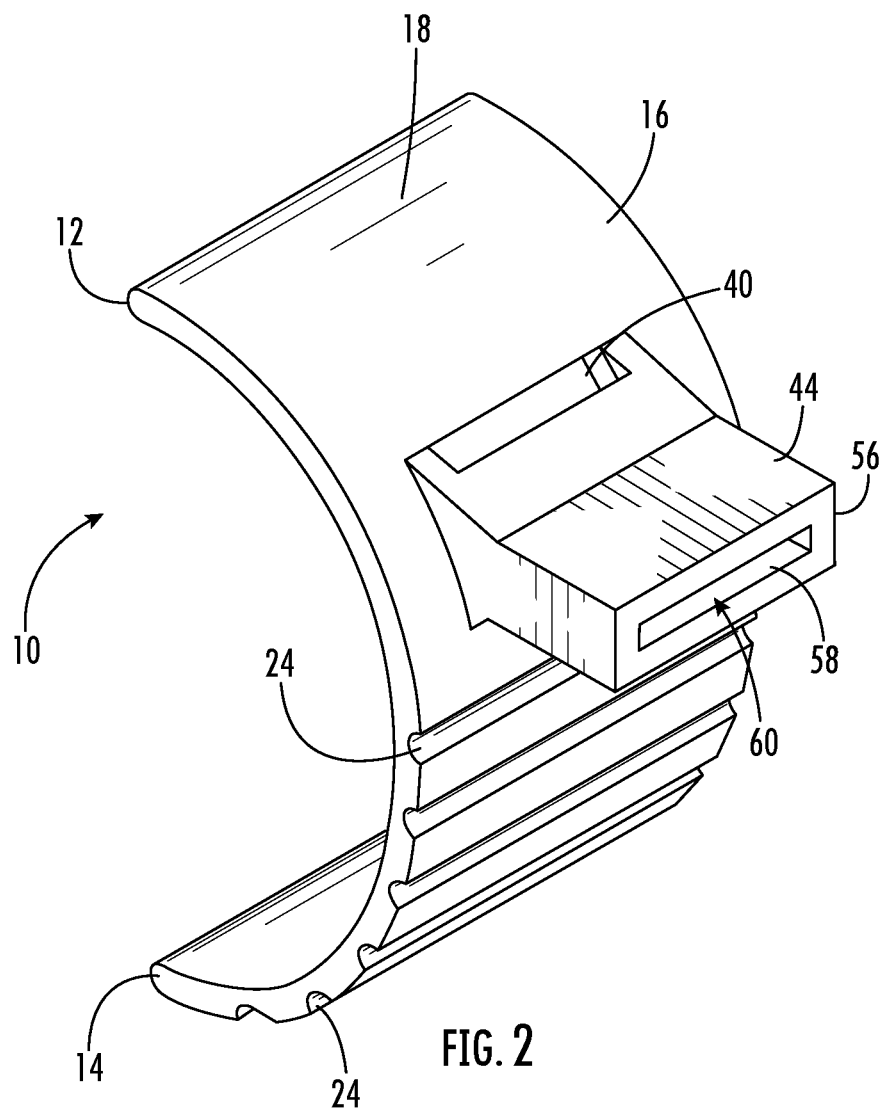
FIG. 2 is an alternative view of the vehicle bow top clip illustrated in FIG. 1A.
Figure 3:
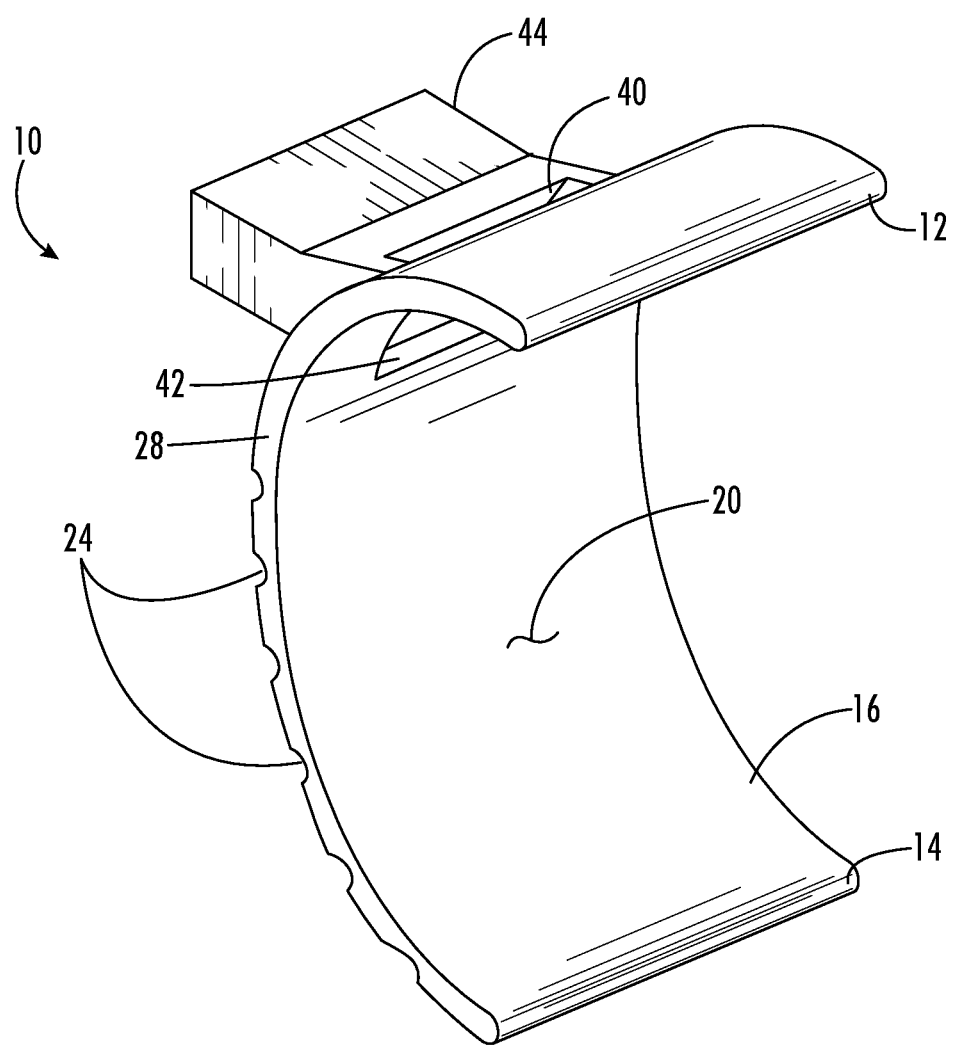
FIG. 3 is a back perspective view of the vehicle bow top clip.
Figure 4:
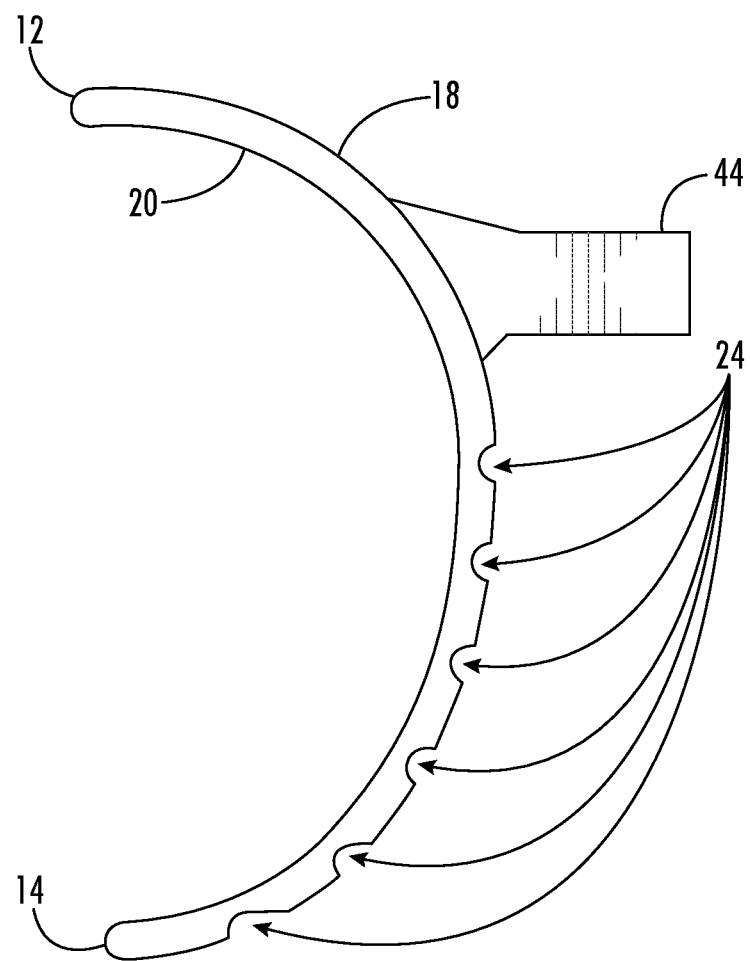
FIG. 4 is a right side view of the vehicle bow top clip.
Figure 5A:
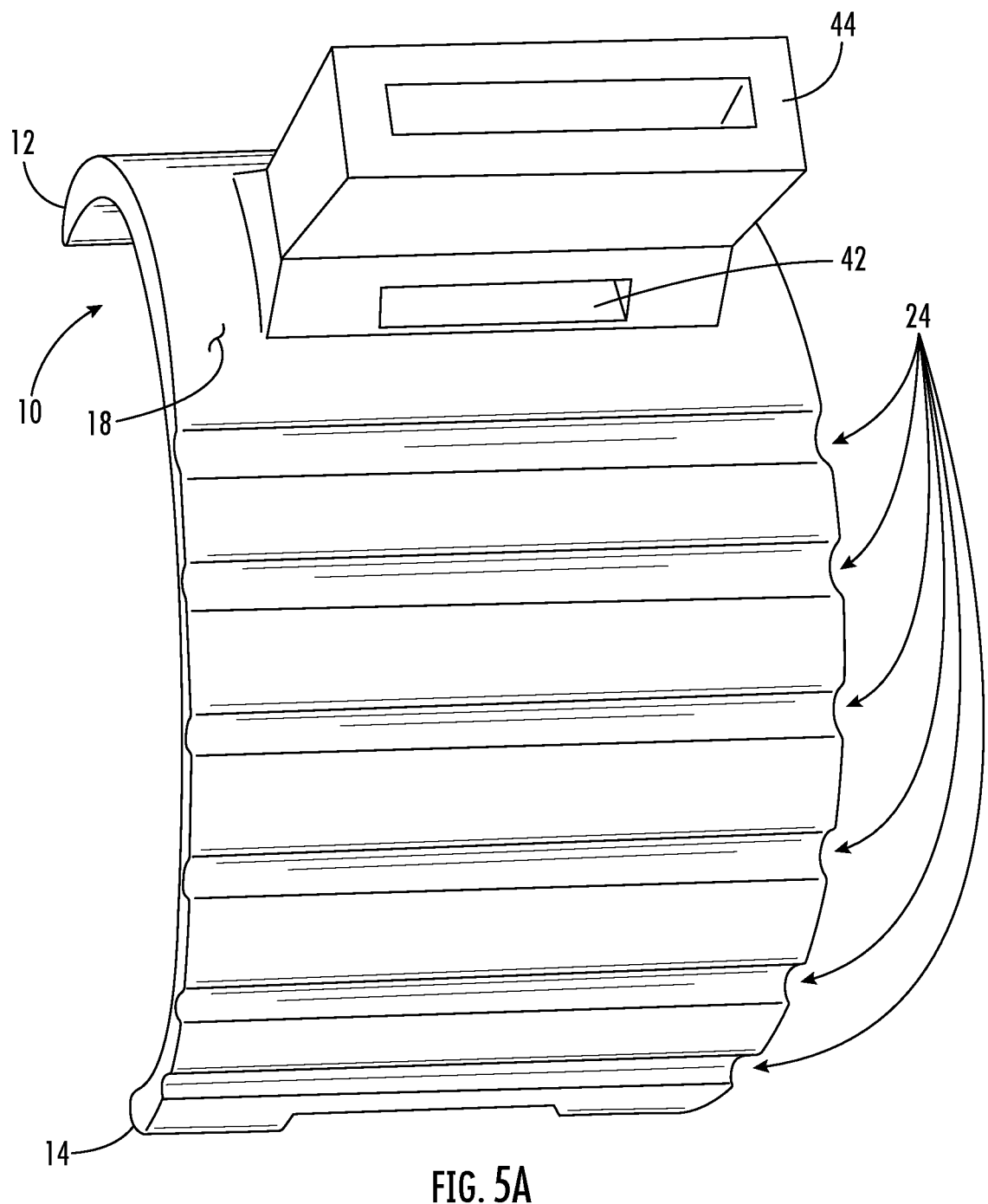
FIG. 5A is a front view of the vehicle bow top clip.
Figure 5B:
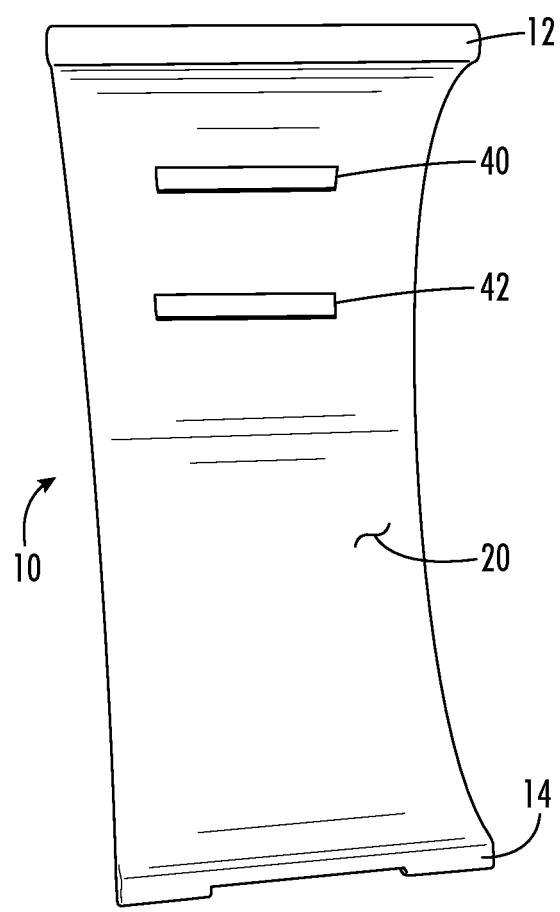
FIG. 5B is a back view of the vehicle bow top clip.

To help prevent the soft top from flapping, the vehicle bow top clip 10 is configured to receive and hold a crossbar member 46, illustrated herein as a bow 48, see FIGS. 10-12. The bow 48 has a first end 50, a second opposing end 52, and a bow main body 54. While the bow 48 is illustrated as having a rectangular shape, other shapes may be used, such as but not limited to having a round shape. The bow main body 54 has a length defined by the distance between or separating the bow first end 50 and the bow second end 52. The crossbar member 46 is configured to fit into and rest within the cross member receiving structure 44. Referring to FIG. 2, the cross member receiving structure 44 comprises a cross member housing unit 56 which extends outwardly or away from the outer surface 18. The crossbar member housing unit 56 comprises a slotted opening 58 sized and shaped to receive at least a portion of the crossbar member 46. The crossbar member 46 is received and held within an interior region 60. The crossbar member 46 is preferably made of a flexible or bendable material.

Figure 6A:
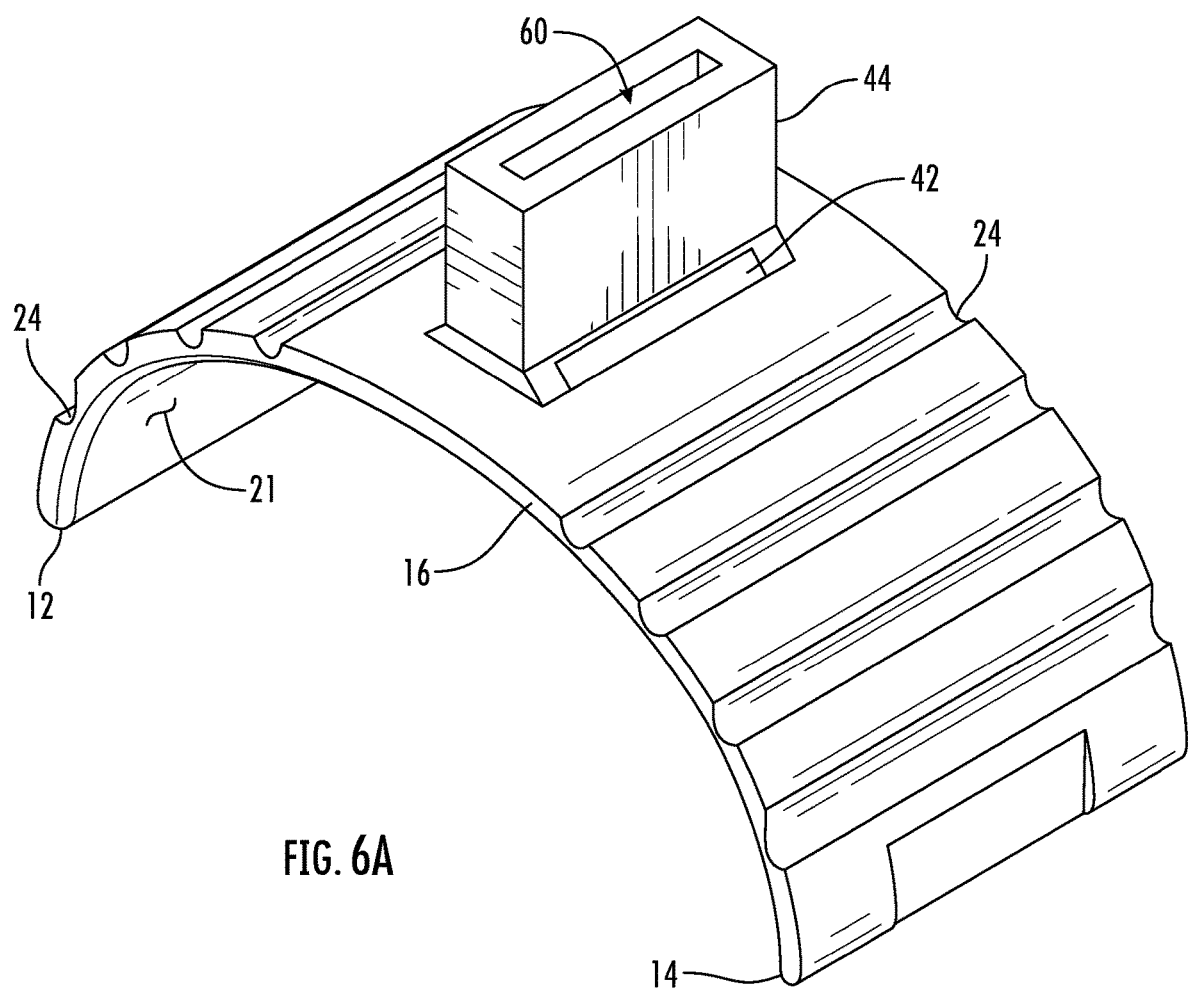
FIG. 6A is an illustration of an embodiment of the vehicle bow top clip having a centrally positioned cross member receiving structure.
Figure 6B:
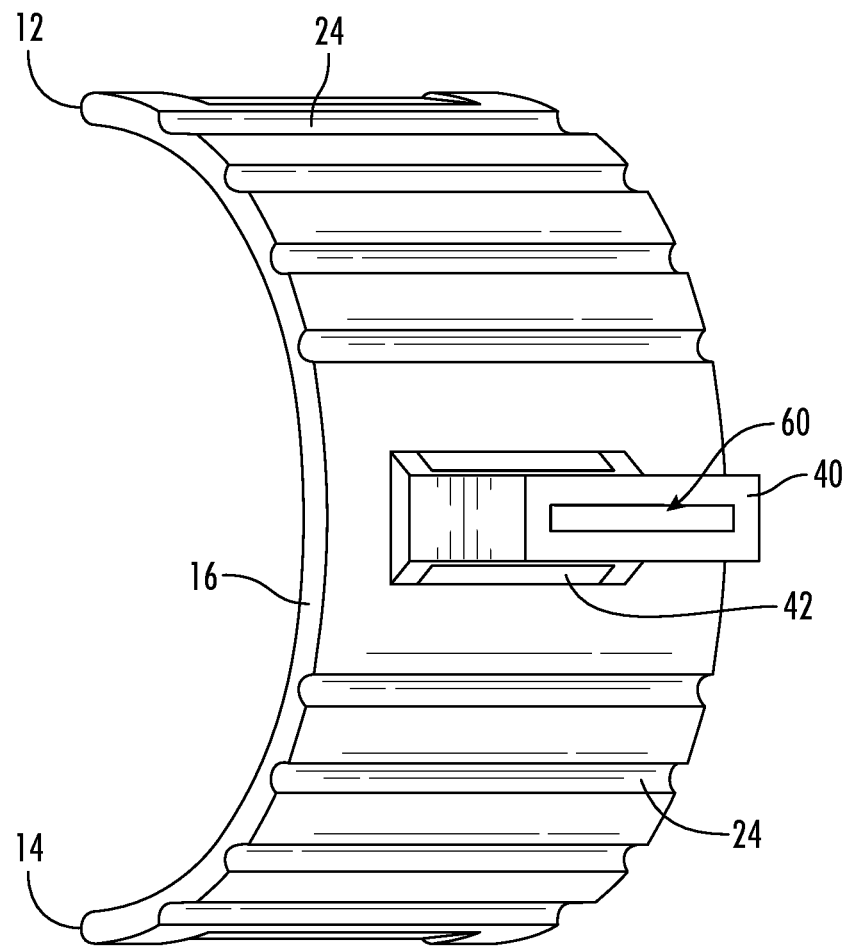
FIG. 6B is an alternative view of the vehicle bow top clip shown in FIG. 6A.
Figure 6C:
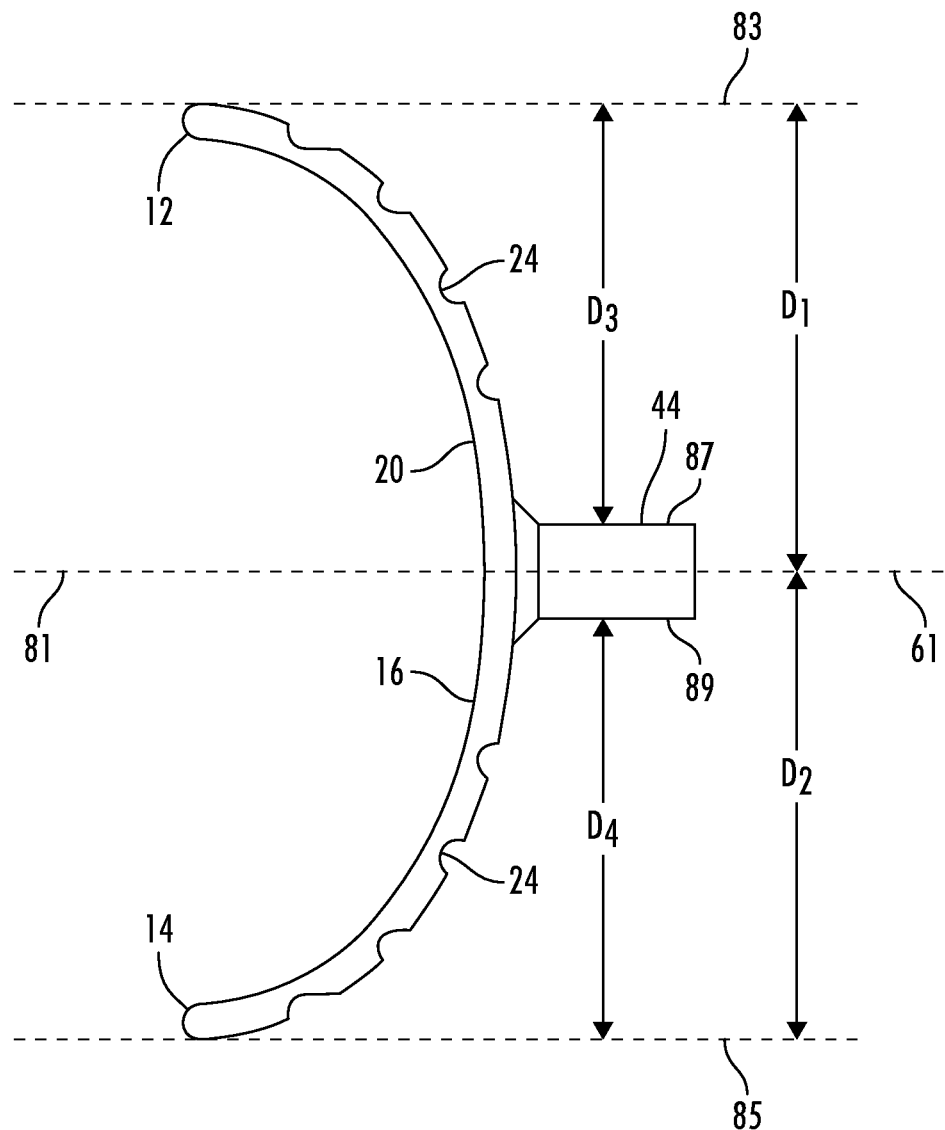
FIG. 6C is a side view of the vehicle bow top clip shown in FIG. 6A.

Referring to FIGS. 6A-6C, the vehicle bow top clip 10 is shown having a centrally positioned cross member receiving structure 44. The vehicle bow top clip 10 illustrated in FIGS. 6A-6C includes all the same features as described above, differing in the positioning of the cross member receiving structure 44, off-center vs. centered. In this orientation, the center positioning may be defined by a longitudinal axis 81 of the cross member receiving structure 44 being positioned on the vehicle bow top clip so the distance between $D_1$ (axis 83 extending from the first end 12) and $D_2$ (axis 85 extending from the second end 14) is the same, see FIG. 6C. Alternatively, the center positioning may include the cross member receiving structure 44 being positioned within the vehicle bow top clip main body 16 so that the distance $D_3$ (distance from an upper surface 87 of the cross member receiving structure 44 to the axis 83 extending from the first end 12) is the same as the distance $D_4$ (distance from a lower surface 89 of the cross member receiving structure 44 to the axis 85 extending from the second end 14). The vehicle bow top clip main body 16 illustrated in FIGS. 6A-6C includes multiple channels 24. Preferably, the number of channels 24 placed within the area defined by $D_1$ or $D_3$ would be the same number of channels 24 placed within the area defined by $D_2$ or $D_4$. Alternatively, the number of channels 24 placed within the area defined by $D_1$ or $D_3$ could be less than or greater than the number of channels 24 placed within the area defined by $D_2$ or $D_4$. In certain embodiments, the bow top clip 10, having a centrally positioned cross member receiving structure 44, may be constructed without channels 24.

Figure 7A:
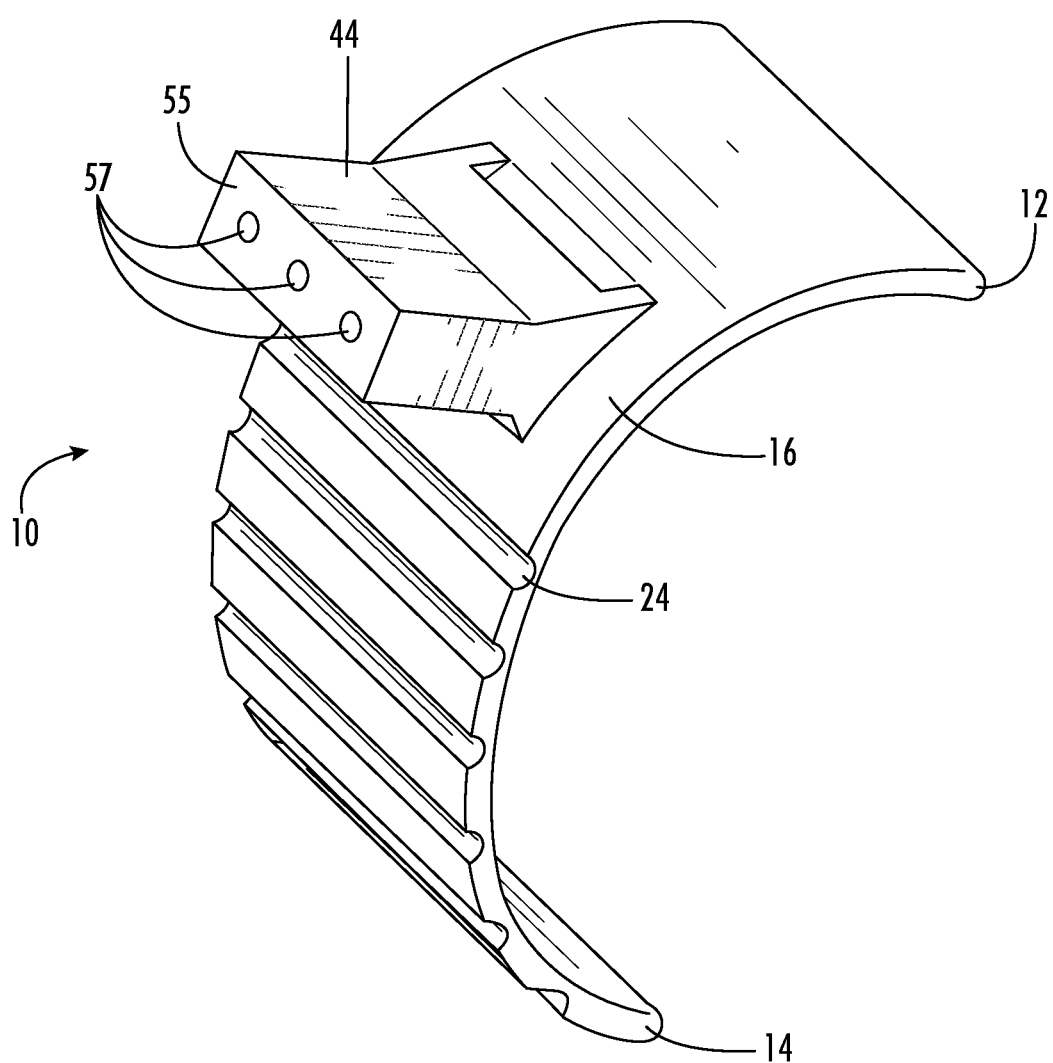
FIG. 7A illustrates the vehicle bow top clip with the crossbar member housing unit comprising a screw boss feature.
Figure 7B:
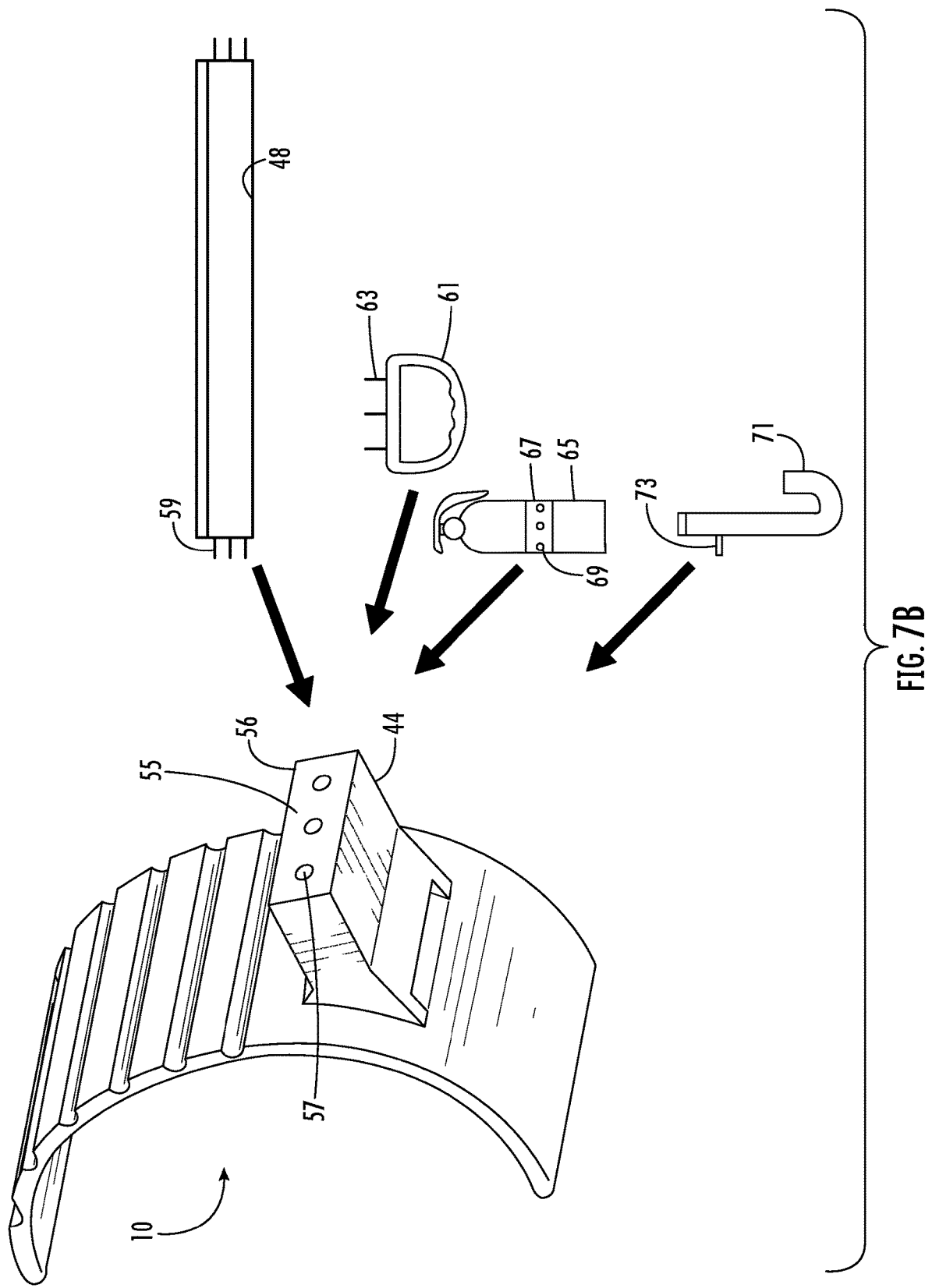
FIG. 7B illustrates the screw boss feature with the crossbar member.

While the vehicle bow top clip 10 is illustrated with the crossbar receiving structure crossbar member housing unit 56 having a slotted opening 58 sized and shaped to receive at least a portion of the crossbar member 46, other structural components known to one of skill in the art may be used as well. FIG. 7A illustrates the vehicle bow top clip 10 with the crossbar member housing unit 56 comprising a boss feature, illustrated herein as a screw boss 55 with one or more screw channels 57. The screw boss screw channels 57 may be sized and shaped to receive screws 59 (or other fastening structures) that are part of the crossbar member 46, see FIG. 7B. Other structural components may include, for example, a twist lock feature. In addition to the crossbar member 46/bow 48, other structures, such as a grab handle 61 with corresponding screws 63, a fire extinguisher 65 with a fire extinguisher mount 67 having corresponding screws 69, or a hook 71 with corresponding screw 73, may be secured to the vehicle bow top clip 10 as well. Such additional structures may also be configured to fit or mate with the crossbar member housing unit 56 having the slotted opening 58 as described above.

Figure 7C:
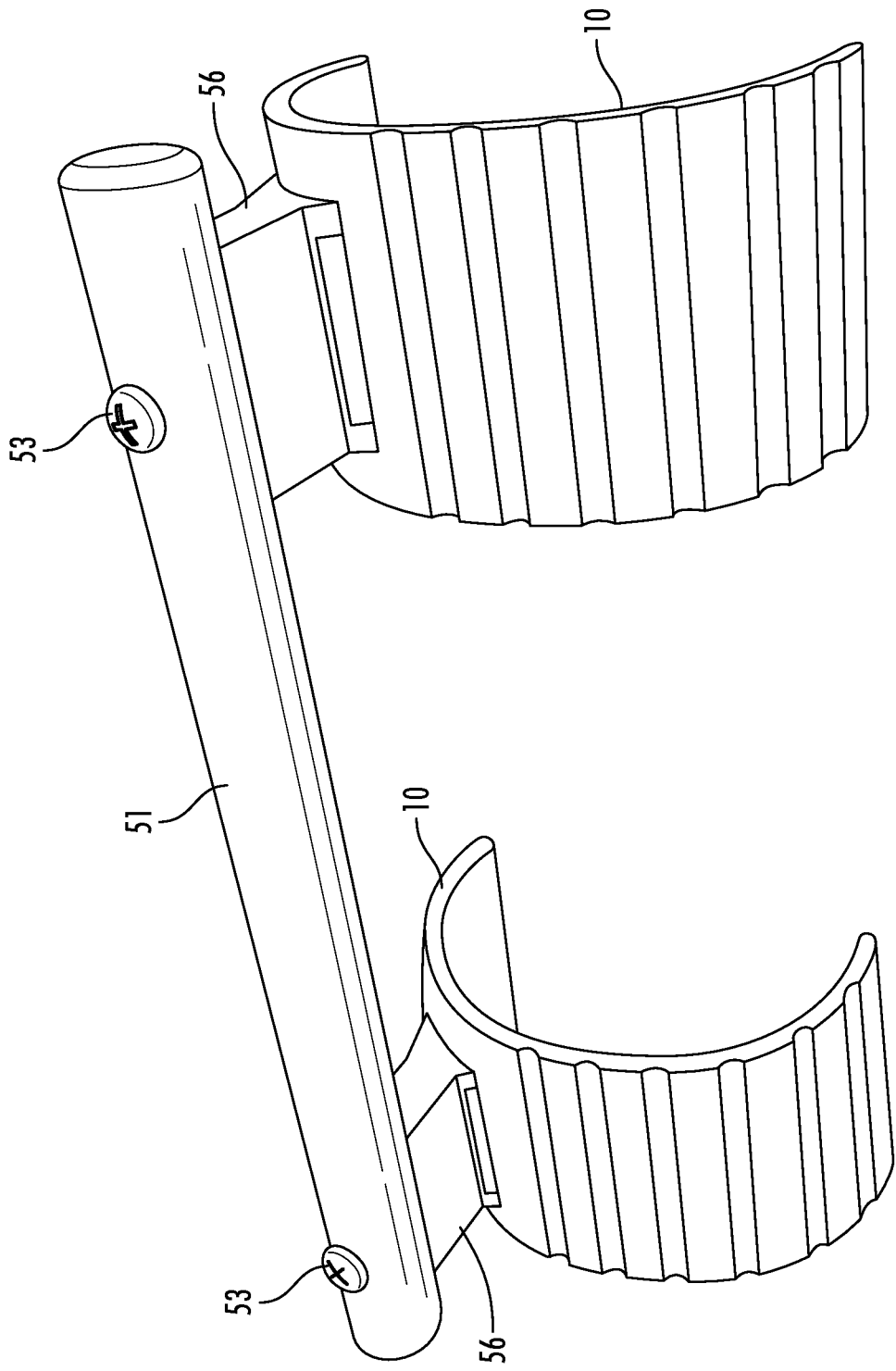
FIG. 7C illustrates multiple vehicle bow top clips with the crossbar member housing unit comprising a boss feature, secured to a hang bar.

FIG. 7C illustrates multiple vehicle bow top clips 10 with the crossbar member housing unit 56 comprising a boss feature. In this embodiment, the crossbar member housing unit 56 uses a boss feature having a single screw channel. In use, a hang bar 51 can be secured to each of the crossbar member housing units 56 of the two vehicle bow top clips 10 via screws 53.

Figure 13A:
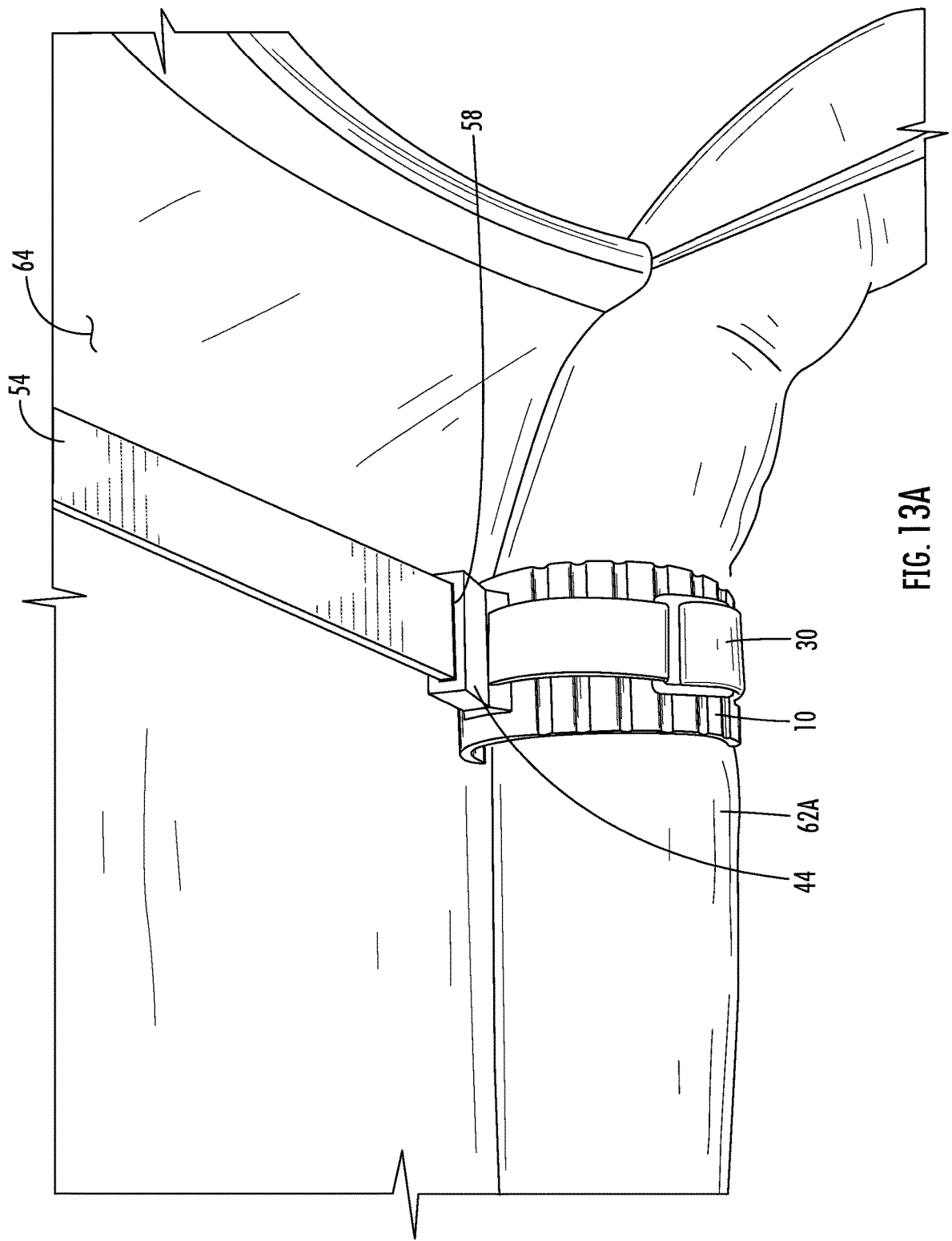
FIG. 13A illustrates a partial view of the vehicle bow top clip secured to a roll bar cage of a JEEP.

FIG. 13A is a partial view of the vehicle bow top clip 10 secured, via securing member 30, to a JEEP roll bar 62A. As shown, the bow main body 54 is inserted into the crossbar member housing unit 56 and held within slotted opening 58 of the cross member receiving structure 44, resting within the cross member receiving structure interior region 60. In this position, the bow main body 54 is in contact with or pushing up against a JEEP soft top 64. Preferably, the size of the bow main body 54 is sufficient so that, when inserted, it flexes or bows upwardly against the soft top 64.

FIG. 13B illustrates a partial view of the vehicle bow top clip with a cross bow (along the roof top) secured to a roll bar cage of a JEEP, along with additional vehicle bow top clips with a hang bar secured to a different section of the roll bar cage. As shown, the bow main body 54 is inserted into the crossbar member housing unit 56 and held within slotted opening 58 of the cross member receiving structure 44, resting within the cross member receiving structure interior region 60. In this position, the bow main body 54 is in contact with or pushing up against a JEEP soft top 64. Preferably, the size of the bow main body 54 is sufficient so that, when inserted, it flexes or bows upwardly against the soft top 64. Two additional vehicle bow top clips 10 (with the crossbar member housing unit 56 comprising a boss feature, see FIG. 7C) are secured to a different section of the JEEP roll bar 62A. Hang bar 51 is secured to the two-additional vehicle bow top clips 10 via screws 53.

Figure 14:
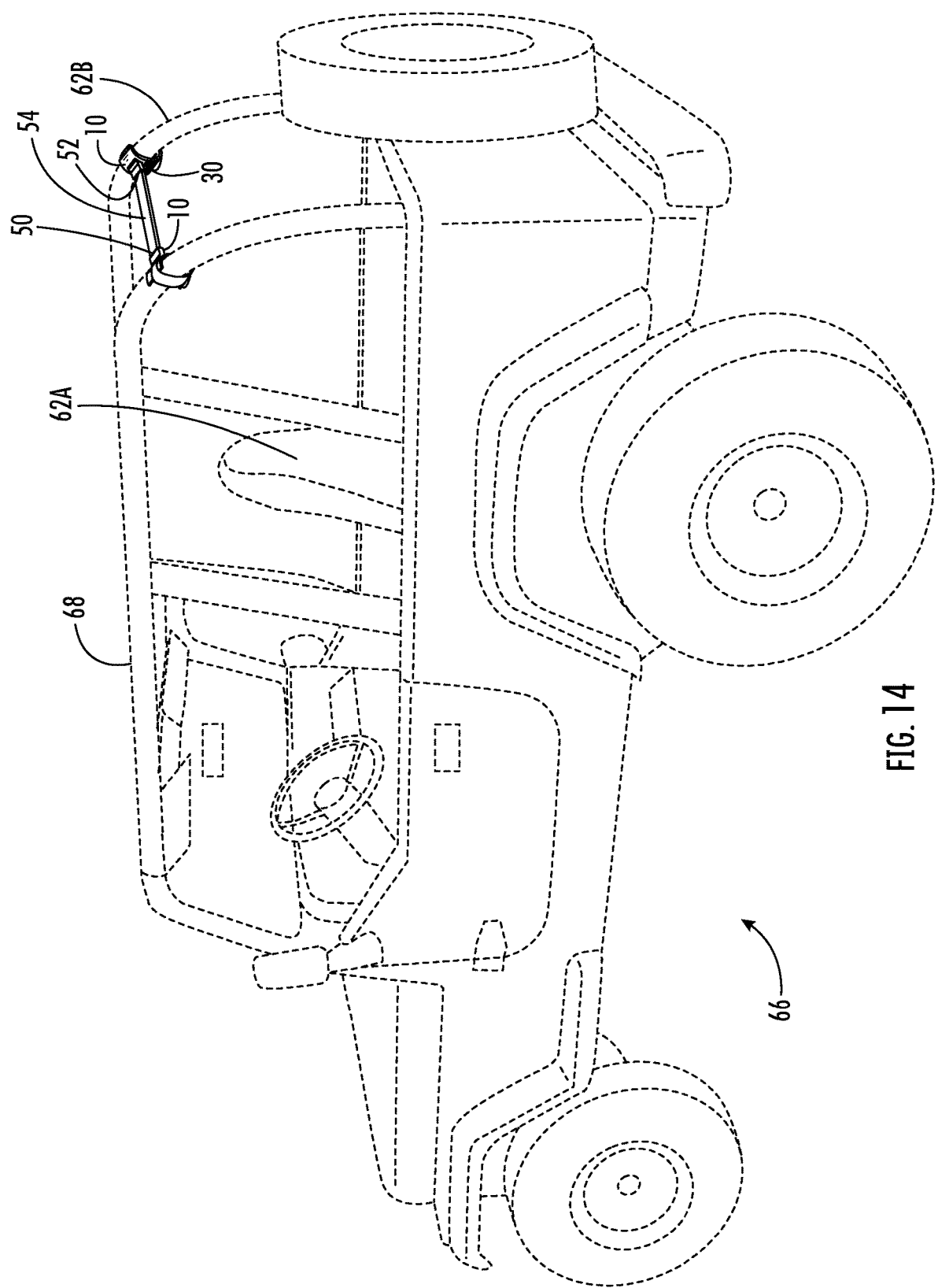
FIG. 14 illustrates a JEEP with the soft top removed to show two vehicle bow top clips with a crossbar member secured thereto secured to a roll bar cage of the JEEP.

FIG. 14 illustrates a JEEP 66 with the soft top 64 removed. In use, two of the vehicle bow top clips 10 are used and engage with, mount on, or secure to roll bar 62A and roll bar 62B. The bow main body 54 is placed so the first end 50 is inserted into the cross member receiving structure 44 secured to roll bar 62A and the second end 52 is inserted into the cross member receiving structure 44 secured to roll bar 62B. In a preferred embodiment, the bow main body 54 has a length that is longer than the distance between roll bars 62A and 62B so as to promote bending or flexing in order to bow upwardly.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A system for use with soft tops in vehicles, comprising: a bow top clip body comprising a first end and a second end, said bow top clip body comprising a structure receiving member comprising a housing unit which extends outwardly or away from an outer surface of said bow top clip body, said housing unit constructed and arranged to receive and secure thereto a secondary attachable structure, said housing unit further comprising a mating surface constructed and arranged to secure to or engage with a corresponding mating surface of said secondary attachable structure.

2. The system for use with soft tops in vehicles according to claim 1, wherein said structure receiving member is centrally positioned.

3. The system for use with soft tops in vehicles according to claim 1, wherein said structure receiving member is positioned off-center.

4. The system for use with soft tops in vehicles according to claim 1, wherein said housing unit mating surface comprises one or securing structures constructed and arranged to secure to or engage with one or more corresponding mating surface securing structures of said secondary attachable structure.

5. The system for use with soft tops in vehicles according to claim 1, wherein said mating surface includes a screw boss with one or more screw channels.

6. The system for use with soft tops in vehicles according to claim 1, wherein said mating surface includes a slotted opening.

7. The system for use with soft tops in vehicles according to claim 1, wherein said secondary attachable structure is a cross bar.

8. The system for use with soft tops in vehicles according to claim 1, wherein said secondary attachable structure is a grab handle.

9. The system for use with soft tops in vehicles according to claim 1, wherein said secondary attachable structure is a fire extinguisher.

10. The system for use with soft tops in vehicles according to claim 1, wherein said secondary attachable structure is a hook.

11. The system for use with soft tops in vehicles according to claim 1, wherein said vehicle bow top clip body is curved.

12. The system for use with soft tops in vehicles according to claim 1, wherein said vehicle bow top clip body has a concave curvature, thus assuming a C-shape or partial C-shape configuration.

13. The system for use with soft tops in vehicles according to claim 1, wherein said vehicle bow top clip body is made of a flexible or semi-flexible material.

14. The system for use with soft tops in vehicles according to claim 1, wherein said vehicle bow top clip body comprises at least one cut out or channel.

15. The system for use with soft tops in vehicles according to claim 1, further including a securing member configured to secure said vehicle bow top clip body to a portion of a vehicle.

16. The system for use with soft tops in vehicles according to claim 15, wherein said securing member is a strip of material having at least one securing mechanism.

17. The system for use with soft tops in vehicles according to claim 16, wherein said at least one securing mechanism is a loop or hook fastening member.

18. The system for use with soft tops in vehicles according to claim 1, further including a crossbar.

19. The system for use with soft tops in vehicles according to claim 1, further including a second bow top clip body, said second bow top clip body comprising a first end and a second end, said second bow top clip body comprising a second structure receiving member comprising a housing unit which extends outwardly or away from an outer surface of said second bow top clip body, said housing unit constructed and arranged to receive and secure therein a secondary attachable structure, said housing unit comprising a mating surface constructed and arranged to secure to or engage with a corresponding mating of said secondary attachable structure.

20. The system for use with soft tops in vehicles according to claim 19, wherein said second bow top clip body housing unit mating surface comprises one or more securing structures constructed and arranged to secure to or engage with one or more corresponding mating surface securing structures of said secondary attachable structure.

* * * * *